W. D. PATTON.
ARTIFICIAL TROLLING BAIT.
APPLICATION FILED FEB. 21, 1919.
1,317,890.
Patented Oct. 7, 1919.
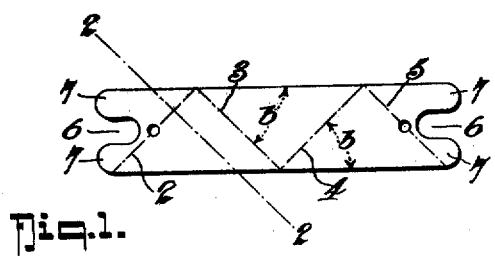
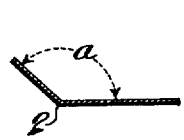
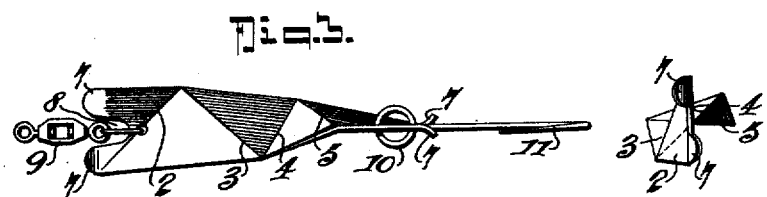
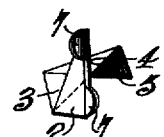
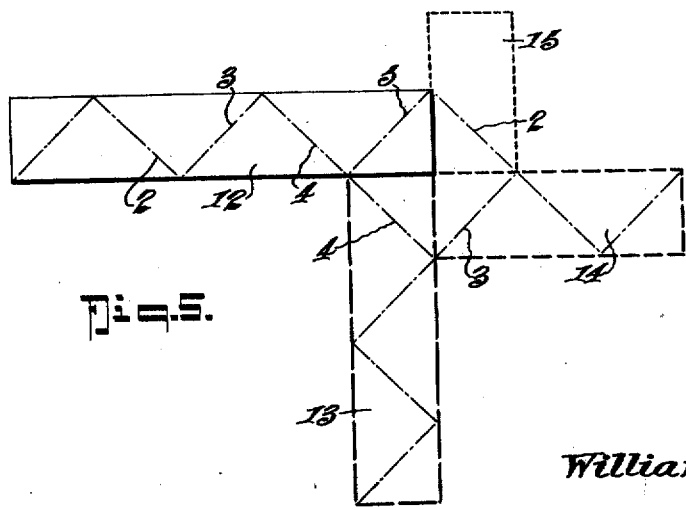
INVENTOR
William D. Patton.

UNITED STATES PATENT OFFICE.

WILLIAM D. PATTON, OF VANCOUVER, BRITISH COLUMBIA, CANADA.

ARTIFICIAL TROLLING-BAIT.

1,317,890.  Specification of Letters Patent.  Patented Oct. 7, 1919.

Application filed February 21, 1919. Serial No. 278,424.

*To all whom it may concern:*

Be it known that I, WILLIAM D. PATTON, a citizen of the Dominion of Canada, residing at Vancouver, in the Province of British Columbia, Canada, have invented certain new and useful Improvements in Artificial Trolling-Baits, of which the following is a specification.

This invention relates to an artificial trolling bait for fish and is of that class known as a "spinner" wherein the bait rotates about its axis by its movement through the water. The object of the invention is to provide a series of light reflecting plane surfaces disposed about the axis of rotation as a relatively short length of a coarse pitched screw.

A "spinner" bait formed as a spiral or screw has previously been used but in all such with which I am acquainted the acting surface of the blade has followed the natural curvature of the screw thread, and the light reflected from it assumes the aspect of a line or spot of light, whereas by forming the surface as a series of triangular planes the reflected light forms a succession of flashes.

This intermittent light will not only render the bait more conspicuous to attract the notice of the fish but it more closely resembles the flashes of light reflected from the small fish on which the larger fish feed.

The invention is fully described in the following specification, reference being made to the drawings in which:

Figure 1 shows the development of the blank or strip from which the bait is formed.

Fig. 2 is a view on the line 2—2 showing the angle between the adjacent triangular planes.

Fig. 3 is a plan view of the bait complete.

Fig. 4, an end view of the same, and

Fig. 5, a diagram illustrating the evolution of the spiral or twist of the triangular planes.

The bait is constructed from a thin, flat, strip of sheet metal with parallel edges, as shown in Fig. 1. This strip is bent to alternately opposite sides along lines 2, 3, 4, 5, which are at an angle $b$ of approximately forty-five (45°) degrees from the edges of the strip, to an angle $a$ of approximately one hundred and thirty-five (135°) degrees, as shown in Fig. 2. Either of these angles $a$ or $b$ may be varied as also may the number of bends and the length of the strip in relation to the width, but as given are found to satisfy the requirements.

In a strip so bent, the edges conform, in a series of straight lines, to the edges of a coarse pitched spiral twist or screw.

The evolution of this twist, from a series of triangular planes is difficult to describe but can be readily understood if a narrow strip of paper, the opposite faces of which are differently colored, is rolled as shown in the diagram illustrated in Fig. 5. The strip is shown at 12 to the left and is folded downward along the line 5 to the position 13, when the opposite face of the strip is shown to the front: then along the line 4 in the same manner to the position at 14 to the right: again along the line 3 vertically upward to the position 15 and along the line 2 to the original line of 12.

Though the folds in each case are downward, the face of the strip is reversed at each fold, so that the alternate folds are opposite. The number of folds may be increased beyond what is shown in the drawing. The appearance of the strip, when fully folded, is a square and forms a flattened spiral or screw thread. If endwise drawn by the ends from the folds, the strip will assume the coarse pitch spiral of triangular planes as described.

It must be distinctly understood that this folded strip as described is only illustrative of the evolution of the twist or screw thread of triangular planes and does not in any manner refer to the process of manufacture of the bait.

It is found sufficient to provide the "spinner" with four bends to bring the plane of one end quartering with that of the other.

One end is connected by a ring 8 and swivel 9 to the trolling line, and to the other end the hook 11 is connected by a ring 10.

At each end, adjacent the ring connection of the trolling line and hook, a portion 6 is cut away leaving rounded projections 7 on each side of the connection. These projecting ends 7 may be oppositely bent, as shown in Figs. 3 and 4, to have a rotatory action on the bait, assisting or checking the rotatory effect of the twisted disposition of the triangular planes, and they afford a ready means of regulating the spin of the bait to the speed of trolling.

Though these ends 7 may be bent as desired, as manufactured the end 7, which is farther from the line of bend to the adjacent plane, is left flat in the plane of which it forms a part, while that which is nearer to the line of the bend is bent back to the flat of the adjacent plane.

It will be noticed that this bait has its hook 11 directly connected to the bait, so that it rotates with it, in which respect it differs from all "spinner" baits with which I am acquainted, where the hook or hook flight is connected either directly to the trolling line or to some non-rotating part connected therewith, so that the hook does not rotate with the bait.

I consider it advantageous to allow the hook to rotate with the bait as by such rotation the identity of the hook as such cannot be discerned.

Having now particularly described my invention, I hereby declare that what I claim as new and desire to be protected in by Letters Patent is:

1. An artificial trolling bait, comprising a relatively narrow strip of thin material having provision at one end for attachment of it, by a swivel, to the trolling line and at the other end for connection of the hook to it, said strip intermediate of the ends bent in opposite directions across its entire width on diagonal lines to form angularly related flat planes to rotate the bait about an axis through the point of connection to the trolling line.

2. An artificial trolling bait comprising a relatively narrow strip of thin material having provision at one end for attachment by a swivel to the trolling line and at the other end for connection of the hook to it, said strip intermediate of its ends being bent to form a succession of triangular flat plates oppositely angled to rotate the bait about an axis through the point of connection of the trolling line.

In testimony whereof I affix my signature.

WILLIAM D. PATTON.

Copies of this patent may be obtained for five cents each, by addressing the "Commissioner of Patents, Washington, D. C."